H. W. ROBBINS.
HINGE JOINT FOR WIND SHIELDS.
APPLICATION FILED APR. 1, 1912.

1,155,441.

Patented Oct. 5, 1915.

Witnesses.

Inventor.
Henry W. Robbins
by Wilhelm, Parker & Ward
Attorneys.

UNITED STATES PATENT OFFICE.

HENRY W. ROBBINS, OF MEDINA, NEW YORK.

HINGE-JOINT FOR WIND-SHIELDS.

1,155,441.     Specification of Letters Patent.     Patented Oct. 5, 1915.

Application filed April 1, 1912. Serial No. 687,716.

*To all whom it may concern:*

Be it known that I, HENRY W. ROBBINS, a citizen of the United States, residing at Medina, in the county of Orleans and State of New York, have invented a new and useful Improvement in Hinge-Joints for Wind-Shields, of which the following is a specification.

This invention relates more particularly to hinge joints for wind shields or glass fronts for automobiles in which the shield or a portion thereof is adjustable to different positions relative to its support or the remainder of the shield, but the invention is not limited in its use to wind shields and may be employed for various other purposes in which it is desired to hinge two parts together so that they can be adjustably secured in various positions relative to each other.

One object of this invention is to provide a simple and economical hinge joint for this purpose which will permit the parts connected thereby to be easily adjusted to different positions relative to each other and will hold the parts securely and firmly in their various adjusted positions.

A further object of this invention is to provide a hinge joint of this type having an adjustable stop for limiting the extent to which the engaging portions of the joint can be released, so that there will be sufficient engagement between these portions when released to hold the parts from turning until some force is applied to them.

Figure 1:
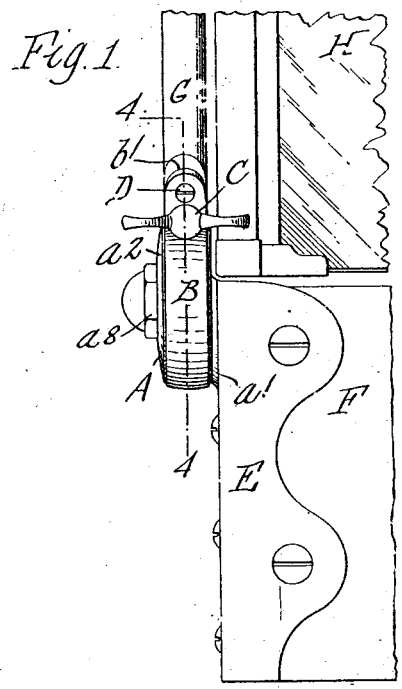
Figure 2:
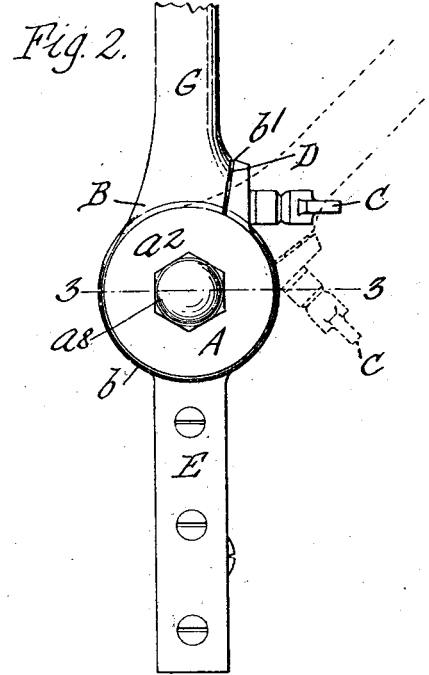
Figure 3:
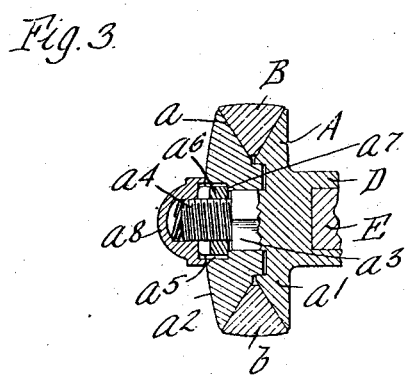
Figure 4:
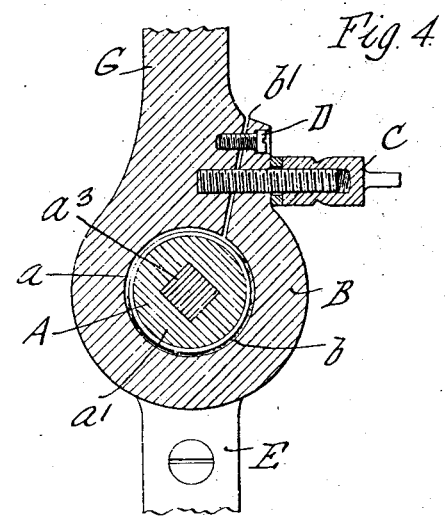

In the accompanying drawings: Figure 1 is a fragmentary side elevation of a wind shield provided with a hinge joint embodying the invention. Fig. 2 is an end elevation thereof. Fig. 3 is a cross-section thereof, on an enlarged scale, in line 3—3, Fig. 2. Fig. 4 is a section thereof, on an enlarged scale, in line 4—4, Fig. 1.

Like reference characters refer to like parts in the several figures.

The hinge joint comprises two members A and B, the member A having a circumferential tapered groove $a$ and the member B having a tapered ring $b$ which is located in this groove and is adapted to turn therein for permitting the members to be adjusted relative to each other and to be wedged or clamped therein for holding the members from relative movement in their adjusted positions.

For producing a wedging or clamping engagement between the ring $b$ and the tapering sides of the groove $a$, any suitable means may be employed. In the construction shown, the ring is split at $b'$ and a screw-threaded post is provided which is secured to one end of the split ring and extends through an opening in the other end thereof and is provided at its outer end with a thumb nut C. By turning this nut the split ends of the ring can be drawn together, thus contracting the ring and causing it to wedge in the tapered groove $a$ for clamping the members together. When the nut C is released, the ends of the ring will separate, permitting the ring to expand so that one member can be turned relative to the other.

To limit the expansion of the split ring when the thumb nut is released, a suitable adjustable stop is preferably provided which, in the construction shown, consists of a screw D which is loosely mounted in one end of the split ring and has screw-threaded engagement with the other end thereof. By adjusting this screw the distance to which the ends will separate under the expansion action of the ring may be limited as desired. This permits the ring to be released sufficiently so that the members of the joint may be turned relatively to each other by hand but can not turn or shift their relative position of their own accord. This is of especial advantage in wind shields where the hinged joints are arranged at each end of the shield and it is necessary to release both joints before adjusting the movable part of the shield.

The member A preferably consists of a fixed part $a'$ and an adjustable part $a^2$. The fixed part carries one of the inclined faces which form the tapered groove $a$ and the adjustable part carries the other face. Any suitable means may be employed for adjustably securing these parts together. In the construction shown, the fixed part $a'$ is provided with a square shank portion $a^3$ which terminates in a screw-threaded post $a^4$, and the adjustable part $a^2$ has a square opening through which the shank portion $a^3$ extends and an enlarged opening $a^5$ which surrounds the post $a^4$. A nut $a^6$ on the post $a^4$ is adapted to engage a shoulder $a^7$ formed on the part $a^2$ at the inner end of the enlarged opening $a^5$ and holds the part $a^2$ in position on the shank $a^3$. By turning this nut, the part $a^2$ can be adjusted relative to the part $a'$ for regulating the size of the tapered groove $a$ to fit the tapered ring $b$ and to take up wear on the engaging faces of the groove. A jam nut $a^8$ on the outer end of the post $a^4$ closes the opening $a^5$.

If it is desired to disconnect the two members of the joint, this can be readily done by unscrewing the jam nut $a^8$ and the adjusting nut $a^6$ and taking off the part $a^2$. The split ring $b$ can then be removed. By arranging the ring $b$ in the groove $a$, the ring has but a very limited lateral movement relative to the member A even when released and the two members of the joint are at all times held in substantial alinement with each other.

The two members of the joint may be secured to the parts which are to be connected thereby in any suitable manner. In the construction shown, the member A has a channel portion E which is preferably formed integral with the part $a'$ and embraces and is secured to the end of the usual wooden dash or shield base F, and the member B is formed integral with the end of a rod G which carries a glass shield H which is secured thereto by suitable means (not shown). Similar connections are employed for the other end of the shield.

The employment of tapered engaging parts between the two members of the joint affords a greatly increased area of engaging surface between them without materially increasing the size or width of the joint, and the wedging action produced when these tapered parts are drawn together enables the two members of the joint to be securely and firmly clamped or forced together so that relative movement thereof is practically impossible until the members are released. The clamping or binding action is such that the joints will not work loose or become released under the constant jar and vibration to which they are subjected when used on wind shields, and the parts of the shield connected thereby can thus be securely retained in their adjusted position. The joint is simple and economical in construction, can be easily assembled, and readily manipulated for securing the parts connected thereby in different adjusted positions.

I claim as my invention:

1. A hinge joint for wind shields comprising two parts having oppositely disposed faces forming a groove, means for adjusting said parts toward and from each other, a ring located and adapted to turn in said groove, and means for contracting said ring for holding said ring and parts from relative movement, substantially as set forth.

2. A hinge joint for wind shields comprising a part having a circumferential friction face, a second part having a circumferential friction face oppositely disposed with regard to the face of said first part, said faces forming a groove, means for adjusting said parts toward and from each other, a ring located and adapted to turn in said groove and having friction faces engaging the faces of said parts, and means for moving the faces of said ring into engagement with the faces of said parts for holding said ring and parts from relative movement.

3. In a hinge joint for wind shields comprising a part having a circumferential beveled face, a second part having a circumferential beveled face, means for adjusting said second part toward and from said first part, a tapered ring located and adapted to turn in the groove formed by said beveled faces, and means for contracting said ring whereby it is wedged into said groove for holding said ring and parts against relative movement, substantially as set forth.

4. A hinge joint for wind shields comprising a part having a circumferential beveled face, a stud secured to said part, a second part having a circumferential beveled face, means for adjusting said second part toward and from said first mentioned part on said stud, a tapered ring located and adapted to turn in the groove formed by said beveled faces, and means for contracting said ring whereby it is wedged into said groove for holding said ring and parts from relative movement, substantially as set forth.

5. A hinge joint for wind shields comprising a member provided with a circumferential beveled face, a stud secured to said first named member, a second member slidably movable upon said stud toward and from said first named member, means for holding said second named member in adjustable positions, a tapered ring located and adapted to turn in a groove formed by said beveled faces, and means for contracting said ring whereby it is wedged into said groove for holding said ring and members from relative movement, substantially as set forth.

6. A hinge joint for wind shields comprising a member composed of opposing parts having beveled faces which form a circumferential tapered groove, means for adjusting one of said parts relative to the other to compensate for wear in the groove, a second member having a tapered ring located and adapted to turn in said groove, and means for wedging said ring in said groove to hold the members from relative movement, substantially as set forth.

7. A hinge joint for wind shields comprising a member provided with a circumferential tapered groove, a second member having a tapered ring located and adapted to turn in said tapered groove, means for contracting said ring in said groove for frictionally holding the ring in said groove, and means independent of said first mentioned means for locking the ring against movement in said groove.

Witness my hand, this 29th day of March, 1912.

HENRY W. ROBBINS.

Witnesses:
J. A. NOE,
A. L. McGEE.